United States Patent [19]

Harrison

[11] Patent Number: 4,950,028
[45] Date of Patent: Aug. 21, 1990

[54] HYDRAULIC BRAKING SYSTEM

[75] Inventor: Anthony W. Harrison, Birmingham, Great Britain

[73] Assignee: Lucas Industries Public Limited Company, Birmingham, England

[21] Appl. No.: 272,439

[22] Filed: Nov. 17, 1988

[30] Foreign Application Priority Data

Nov. 20, 1987 [GB] United Kingdom ............... 8727296

[51] Int. Cl.$^5$ .......................... B60T 8/58; B60T 8/46
[52] U.S. Cl. .................................... 303/115; 303/113; 303/116
[58] Field of Search ..................... 303/20, 61, 92, 113, 303/114, 115, 119, 116; 188/72.6, 72.8, 72.1, 151 R, 181 A, 162, 156, 348

[56] References Cited

U.S. PATENT DOCUMENTS

| | | | |
|---|---|---|---|
| 3,948,568 | 4/1976 | Leiber | 303/92 |
| 4,653,813 | 3/1987 | Burgdorf | 303/92 |
| 4,658,939 | 4/1987 | Kircher et al. | 188/72.8 X |
| 4,726,549 | 2/1988 | Dittner et al. | 303/115 |
| 4,753,490 | 6/1988 | Belart et al. | 303/114 |
| 4,811,994 | 3/1989 | Friedow | 303/115 |
| 4,826,255 | 5/1989 | Volz | 303/10 |
| 4,826,256 | 5/1989 | Von Hayn et al. | 303/61 |
| 4,835,695 | 5/1989 | Walenty et al. | 303/115 X |
| 4,838,622 | 6/1989 | Kircher et al. | 303/61 |

FOREIGN PATENT DOCUMENTS

| | | | |
|---|---|---|---|
| 0292648 | 11/1988 | European Pat. Off. | 303/115 |
| 2197402 | 5/1988 | United Kingdom | 303/114 |

Primary Examiner—Robert P. Olszewski
Assistant Examiner—Matthew C. Graham
Attorney, Agent, or Firm—Fleit, Jacobson, Cohn, Price, Holman & Stern

[57] ABSTRACT

An hydraulic braking system includes a primary pressure source connected to a brake actuator and operable by a force input device, a fluid displacer actuated by an electrical stepper motor operated by a controller in response to action of the force input device, as sensed by a sensor, whereby fluid displaced from the displacer is added to that displaced from the primary pressure source for application to the brake actuator. By suitable programming of the controller, servo-assistance and/or quick-fill modes can be produced by the displacer and wheel-slip correction and anti-skid facility can be provided.

14 Claims, 1 Drawing Sheet

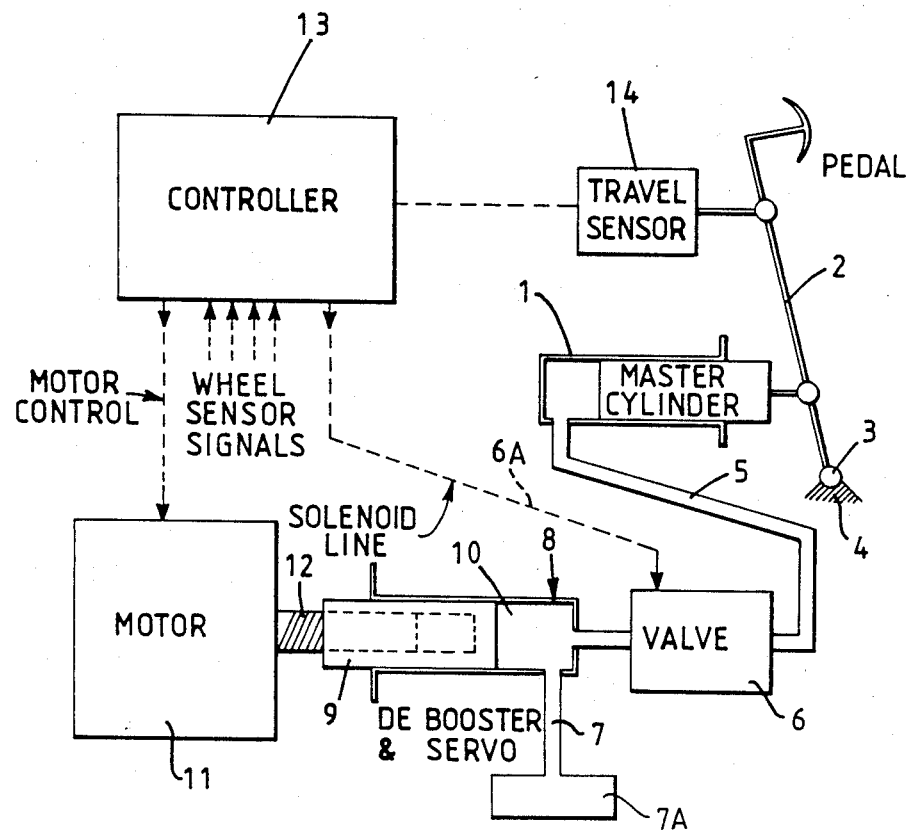

HYDRAULIC BRAKING SYSTEM

BACKGROUND OF THE INVENTION

This invention relates to an hydraulic braking system, primarily for a motor vehicle.

In one prior proposal, electric motors used to generate a primary braking force applied directly to braking elements are actuated by a control system in response to operation of a brake pedal which also actuates a back-up master cylinder, the latter becoming fully effective only in the event of an electrical system failure. In such a system, jamming of an electric motor or any associated force transmission mechanism in the brake-applied condition could result in the associated brake being locked on. Not only is such a situation potentially dangerous, but some dismantling of the brake would be required to free the jammed component giving rise to considerable inconvenience.

BRIEF SUMMARY OF THE INVENTION

An object of the invention is to provide a braking system in which the above stated problem is avoided and which provides additional advantages in terms of flexibility of control and the possibility of using compact components.

According to the invention, a braking system comprises a primary hydraulic pressure source connected to a brake actuator and operable by a force input device, and a fluid displacer actuated by an electrical stepper motor operator by a controller in response to action of the force input device, the arrangement being such that fluid displaced from the fluid displacer is added to that displaced from the primary pressure source for application to the brake actuator.

In such a system, the pressure generated at the actuator is always dependent upon the primary actuating pressure, enabling good braking balance to be obtained. Moreover, in the event of electrical or mechanical failure occurring in the stepper motor or fluid displacer, adequate braking pressure is still available from the primary pressure source.

The additional fluid volume from the fluid displacer is useful primarily to provide a servo-assistance effect at the brake actuator and/or a quick-fill facility. The precise functioning of the displacer in one or both of, or as between these roles, is dependent upon the motor speed controlled by suitable programming of the controller.

It may be convenient to interpose one or more electrically operated cut-off valves between the primary pressure source and the actuator, enabling the primary pressure source to be isolated from the actuator upon actuation of the valve. It is then possible to control the motor in response to the detection of an incipient wheel slip condition occurring on a wheel associated with the brake actuator, (which condition may result from spinning or skidding of the wheel) enabling the fluid displacer to be actuated in a manner such as to de-boost or pressurized the actuator in order to correct the slip condition, and subsequently to restore normal braking pressure.

In one convenient arrangement, the primary pressure source is a pressure cylinder actuated by force input means, such as a brake pedal, and the fluid displacer is a piston axially reciprocable under the action of the stepper motor to vary the volume of a fluid chamer.

BRIEF DESCRIPTION OF THE DRAWING

The invention will now be described, by way of example, with reference to the accompanying drawing which is a diagrammatic representation of one form of the hydraulic braking system of the invention.

DETAILED DESCRIPTION

Referring to the drawing, the braking system shown therein includes a primary hydraulic pressure source in the form of a master cylinder 1 actuated by a lever 2 which may conveniently be a driver-operated brake pedal pivoted at 3 on fixed structure 4, being normally part of a vehicle body. The master cylinder is connected by a line 5 to an electrically operated solenoid valve 6 which is normally open to permit pressurized fluid from the master cylinder to enter a supply line 7 to a brake actuator 7A. The supply line 7, in the arrangement illustrated, is incorporated in a fluid displacer device 8 to which the valve 6 is connected and which includes an axially reciprocable piston 9 partly defining a chamber 10. The piston is driveable by a stepper motor 11 via a conventional form of efficient screw coupling mechanism, part of which can be seen at 12, such that rotation of the motor causes corresponding linear movement of the piston. The motor operates under the influence of an electronic controller 13 to which signals are fed from a displacement sensor 14 actuated by the pedal 2. The controller also receives signals from a wheel speed and/or acceleration sensor associated with the wheel to be braked and activates the solenoid valve 6 via an electrical connection 6A upon the detection of an incipient wheel slip condition by the sensor.

For normal braking operations, the solenoid valve 6 is de-energized, placing the master cylinder 1 in direct communication via the passages 5 and 7 with the brake actuator. Actuation of the pedal lever 2 operates the master cylinder 1 in conventional manner and supplies braking fluid under pressure to the brake. Simultaneously, the pedal lever displacement is sensed by the sensor 14 and a corresponding electrical signal is supplied to the controller which, in turn, operates the motor 11 in a direction such as to move the piston 9 inwardly to pressurize the fluid in the chamber 10. The resulting displaced fluid volume is added to that supplied by the master cylinder and effectively provides servo-assistance to the braking action. Since the operation of the piston is dependent upon pedal travel, the servo effect increases with increased pedal displacement, and vice versa.

It is possible for the motor 11 and piston 9 to perform functions other than or additional to the servo-assistance role described. For example, by programming the controller to move the piston 9 at a higher rate over at least an intial portion of its travel, a relatively large volume of fluid may rapidly be injected into the actuator, enabling it to effect a rapid take-up of braking clearances, prior to the application of large braking forces. Once the taking up of clearances has been completed, the piston 9 may be controlled to provide the servo-assistance mode described above, or any other useful function.

By arranging for the piston 9 to provide the larger part of the required braking effort, it is possible to use a master cylinder of very compact proportions, as compared with conventional master cylinders. It will be possible, for example, to supply three parts of the required volume by means of the motor driven piston and one part from the master cylinder.

The system described can also operate in an anti-skid mode. Upon the sensing by the wheel sensor of an incipient wheel skid condition at the braked wheel, the controller produces a signal to energize the solenoid valve 6 in order to isolate the master cylinder 1 from the brake actuator. Simultaneously, or shortly thereafter, the motor energized to move the piston 9 to the left, as seen in the drawing, in order to enlarge the volume of the chamber 10 and thereby de-boost the brake actuator in order to release the brake. Once the skid condition is corrected, the motor is operated in the reverse direction to re-pressurize the actuator and the solenoid valve 6 is de-energized to reconnect the master cylinder to the brake. Normal braking then ensues, accompanied by the servo-effect produced by the piston 9.

The solenoid valve 6 is normally held in its open position, conveniently by the action of a spring which is overcome when the solenoid is energized to close the valve. This provides a convenient fail safe arrangement, enabling the master cylinder to be placed immediately in communication with the brake in the event of power failure, in order to maintain normal braking, Because of the non-operation of the piston 9, the master cylinder 1 would be required to produce additional fluid volume and the input member 2 would therefore be subject to greater displacement than normal.

It is important that the position of the armature of the motor 11, and therefore the piston 9, should have a known datum position which can be used by the controller and means are provided in the system to enable the controller to establish the datum, for example by moving the piston 9 against an abutment during periods when the system is non-operative, in order to check and re-establish the datum position.

The system described can readily be adapted to provide traction control by correcting excessive wheel spin which can occur under certain conditions. For this purpose, the controller 13 is programmed to respond to signals indicative of excessive wheel spin and operates the motor in a direction such as to move the piston 9 to the right, as seen in the drawing, in order to increase the pressure in the brake actuator connected to the chamber 10. The controller also closes the valve 6 in order to isolate the master cylinder 1 from the brake during the traction control mode. Alternatively, if the design of the valve 6 makes such isolation impossible or unreliable when the valve is under pressure from the displacer 8, it is possible to provide an additional solenoid valve means disposed between and in series with the master cylinder 1 and valve 6 and connected to the controller so as to be closed by a signal from the latter when traction control is required in order to prevent pressure developed in the chamber 10 for traction control from being applied to the master cylinder. In an alternative arragement, the additional valve may be in a common housing with the valve 6. The valve 6, or that part operative in the anti-skid mode will normally be open during traction control operation.

Again, by suitable programming of the controller, the system of the invention may be operated to provide a "hill hold" facility. This would normally operate with a vehicle stationary on an incline and with the vehicle in gear and clutch disengaged. An appropriate signal sent from the controller to the motor under these conditions causes the piston 9 to be advanced to pressurize one or more brake actuators so as to prevent the vehicle from running backwards down the hill. Brake pressurization would again be accompanied by isolation of the master cylinder in the manner required for traction control described above. The brake(s) would be released as the clutch is engaged.

Although the invention has been described in relation to a single brake actuator, it will be understood that a typical practical braking system would have at least two master cylinder chambers feeding any convenient number of brake lines and any desired number of wheel slip correction channels could be established to control the brake lines in a desired manner.

I claim:

1. A braking system comprising:
   a a hydraulic circuit including a primary hydraulic pressure source having an actuation parameter, brake actuator means, first fluid connection means between said primary hydraulic pressure source and said brake actuator means, fluid displacer means, and further fluid connectin means between said fluid displacer means and said brake actuator means and between said fluid displacer means and said primary hydraulic pressure source;
   electric motor means drivingly connected to said fluid displacer means for operating said fluid displacer means;
   said fluid displacer means comprising a pressure chamber connected to said brake actuator means by said further fluid connection means, and a piston reciprocative in said pressure chamber by said electric motor means to vary the volume of said pressure chamber to modify the braking pressure in said brake actuator means;
   a screw coupling mechamism operatively connecting said piston to said electric motor means so that rotation of said electric motor means produces linear movement of said piston;
   sensor means for producing an output signal proportional to said actuation parameter of said primary hydraulic pressure source; and
   electronic control means operatively connected to said sensor means and said electric motor means and operable to produce a control signal for actuating said electric motor means in response to said output signal from said sensor means for effecting fluid displacement by said fluid displacer means so that fluid displacement from said fluid displacer and said primary hydraulic pressure source varies the volume of said hydraulic circuit in a controlled proportion to said actuation parameter of said primary hydraulic pressure source.

2. A braking system as claimed in claim 1 wherein:
   said piston has a hollow portion therein;
   an internal screw thread is provided in said hollow portion; and
   an externally screw threaded shaft cooperatively engages said internal screw thread and is connected to said electric motor means, so that rotation of said electric motor means rotatably drives said shaft for producing said linear movement of said piston.

3. A braking system as claimed in claim 1 and further comprising:
   a cut-off valve in said first fluid connection means between said primary hydraulic pressure source and said brake actuator means operable to isolate said primary hydraulic pressure source from said brake actuator means in response to a slip condition of a wheel to be braked by said brake actuator means, said fluid displacer means being actuator to vary the braking pressure in said brake actuator means to correct the slip condition.

4. A braking system as claimed in claim 3, wherein:
said cut-off valve comprises an electrically operated solenoid valve operatively connected to said electronic control means for actuation thereby.

5. A braking system as claimed in claim 1 wherein:
said sensor means comprises a travel sensor;
said actuation parameter comprises a pedal type force input device connected to said travel sensor; and
said output signal represents pedal travel.

6. A braking system as claimed in claim 1 wherein:
fluid output from said primary hydraulic pressure source is directed to said pressure chamber throough said further fluid connection means between said primary hydraulic pressure source and said fluid displacer means; and
an outlet is provided in said pressure chamber connected to said further fluid connection means between said fluid displacer means and said brake actuator means.

7. A braking system as claimed in claim 1 wherein:
said motor comprises a stepper motor.

8. A braking system as claimed in claim 1 wherein:
said electronic control means controls the speed of said motor; and
said fluid displacer means is actuated by said motor in a servo-assistance mode by controlling the speed of said motor.

9. A braking system as claimed in claim 8 wherein:
said motor comprises a stepper motor.

10. A braking system comprising:
a primary hydraulic pressure source connected to a brake actuator;
a force input device connected to said primary hydraulic pressure source for operating said primary hydraulic pressure source to generate braking force at said brake actuator;
an electric stepper motor;
electric control means for operating said stepper motor in response to operation of said force input device; and
a fluid displacer comprising a pressure chamber connected to said brake actuator, a reciprocable piston to vary the volume of said pressure chamber, and a coupling mechanism connecting said piston to said stepper motor whereby rotation of said stepper motor produces resultant linear movement of said piston, so that fluid displaced from said fluid displacer is added to fluid displaced from said primary hydraulic pressure source to modify the braking pressure in said brake actuator.

11. A braking system as claimed in claim 10 wherein:
said electronic control means controls the speed of said motor; and
said fluid displacer is actuated by said motor in a quick fill mode by controlling the speed of said motor.

12. A braking system as claimed in claim 10 wherein:
said fluid displacer further comprises said pressure chamber being connected to said brake actuator by fluid connection means between said fluid displacer and said brake actuator, and said piston is reciprocable in said pressure chamber.

13. A braking system as claimed in claim 10 wherein:
said piston is hollow;
an internal screw thread is provided in said hollow piston;
a cooperatively threaded shaft is drivingly engaged with said internal screw thread and is rotatably drivable by said stepper motor.

14. A braking system as claimed in claim 10 wherein said coupling mechanism comprises:
a screw coupling mechanism operatively connecting said piston to said steper motor means.

* * * * *